United States Patent
Mountford et al.

(10) Patent No.: US 10,624,484 B1
(45) Date of Patent: Apr. 21, 2020

(54) AUTOMATED DELIVERY LOCKER AND ASSEMBLIES

(71) Applicant: Ford Global Technologies, LLC, Dearborn, MI (US)

(72) Inventors: Owen Mountford, Mountain View, CA (US); Christopher Westfall, San Francisco, CA (US); John Michael Ferrer, Carson, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/174,183

(22) Filed: Oct. 29, 2018

(51) Int. Cl.
| | |
|---|---|
| A47G 29/14 | (2006.01) |
| A47B 57/06 | (2006.01) |
| A47B 57/58 | (2006.01) |
| B60R 7/02 | (2006.01) |

(52) U.S. Cl.
CPC ............ *A47G 29/141* (2013.01); *A47B 57/06* (2013.01); *A47B 57/583* (2013.01); *A47G 2029/144* (2013.01); *B60R 7/02* (2013.01)

(58) Field of Classification Search
CPC ........ A47B 57/00; A47B 57/06; A47B 57/583
See application file for complete search history.

(56) References Cited

U.S. PATENT DOCUMENTS

| | | | | | |
|---|---|---|---|---|---|
| 2,200,329 | A * | 5/1940 | Derman | .................. | E06B 9/115 312/260 |
| 2,827,118 | A * | 3/1958 | Wendt | .................. | F25D 23/021 160/184 |
| 5,295,743 | A * | 3/1994 | Moulton | ................. | A47B 96/00 160/236 |
| 6,848,491 | B2 * | 2/2005 | Gambarelli | .............. | B65G 1/02 160/122 |
| 8,714,669 | B1 * | 5/2014 | Clausen | ............... | A47B 49/004 160/37 |
| 9,504,344 | B2 * | 11/2016 | Sarvestani | ......... | A47G 29/1201 |
| 2004/0004419 | A1 * | 1/2004 | Godlewski | ............. | A47B 63/06 312/297 |
| 2009/0121597 | A1 * | 5/2009 | Quella | ................... | A47B 57/00 312/351 |
| 2013/0020270 | A1 * | 1/2013 | Valiulis | ................... | A47F 5/005 211/59.2 |
| 2014/0238383 | A1 * | 8/2014 | Armstrong | .............. | F24C 15/16 126/337 A |
| 2014/0366569 | A1 * | 12/2014 | Babinski | ................ | F25D 23/04 62/377 |
| 2015/0006005 | A1 | 1/2015 | Yu et al. | | |

(Continued)

OTHER PUBLICATIONS

Edelstein, "Udelv Autonomous Delivery Vehicle Begins Testing in California," The Drive, Published Jan. 31, 2018 (3 pages). Retrieved from http://www.thedrive.com/tech/18113/udelv-autonomous-delivery-vehicle-begins-testing-in-california.

(Continued)

*Primary Examiner* — Daniel J Rohrhoff
(74) *Attorney, Agent, or Firm* — Brandon Hicks; Eversheds Sutherland (US) LLP

(57) ABSTRACT

A locker configured to store a package is disclosed. The locker includes a plurality of adjustable storage compartments. The locker also includes a door coupled to the locker. The door is configured to actuate between an open position and a closed position to provide access to at least one of the plurality of adjustable storage compartments.

15 Claims, 13 Drawing Sheets

(56) References Cited

U.S. PATENT DOCUMENTS

| | | | | |
|---|---|---|---|---|
| 2015/0201762 A1* | 7/2015 | Walter | ................... | F21V 21/35 |
| | | | | 211/187 |
| 2016/0235236 A1* | 8/2016 | Byers | ..................... | A47G 29/14 |
| 2016/0372949 A1* | 12/2016 | McCaffrey | ............ | H02J 7/0044 |
| 2018/0271281 A1* | 9/2018 | Bryan | ....................... | A47F 3/06 |

OTHER PUBLICATIONS

Khunshan, "Alibaba's new driverless robot will ship food to customers," Techjuice, Published Jun. 1, 2018 (10 pages). Retrieved from https://www.techjuice.pk/alibabas-driverless-robot-ship-food-customers/.

"Let's Give them Something to Taco 'Bout: Enabling Self-Driving Food Delivery with Postmates," Ford Media Center, Published Jun. 11, 2018, Dearborn, Michigan (2 pages). Retrieved from https://media.ford.com/content/fordmedia/feu/en/news/2018/06/11/let-s-give-them-something-to-taco-bout-enabling-self-driving-f.html.

\* cited by examiner

US 10,624,484 B1

AUTOMATED DELIVERY LOCKER AND ASSEMBLIES

FIELD OF THE DISCLOSURE

The disclosure generally relates to a locker and more particularly relates to a locker comprising one or more adjustable storage compartments and a door configured to provide access to at least one of the adjustable storage compartments.

BACKGROUND

Typical locker delivery systems include a series of static lockers configured to provide a safe and reliable way for customers to pick up their packages. Generally, the process entails a delivery service picking up a package from a distributor, carrying the package to a delivery containment system, and inserting the package into an appropriately sized locker. The customer is then notified that the package has been delivered and is given a code to unlock the appropriate locker to retrieve the delivered package.

One issue with typical locker delivery systems is the wasted space caused by the static lockers. For example, typical locker delivery systems include a limited number of lockers each permanently set with a particular volume. Oftentimes, when almost all of the lockers are filled with packages, some of the larger lockers will be used for smaller packages leading to an inefficient use of space. Therefore, there exists a need to remedy how to effectively use all of the space within a locker delivery system.

Some or all of the above needs and/or problems may be addressed by certain embodiments disclosed herein.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
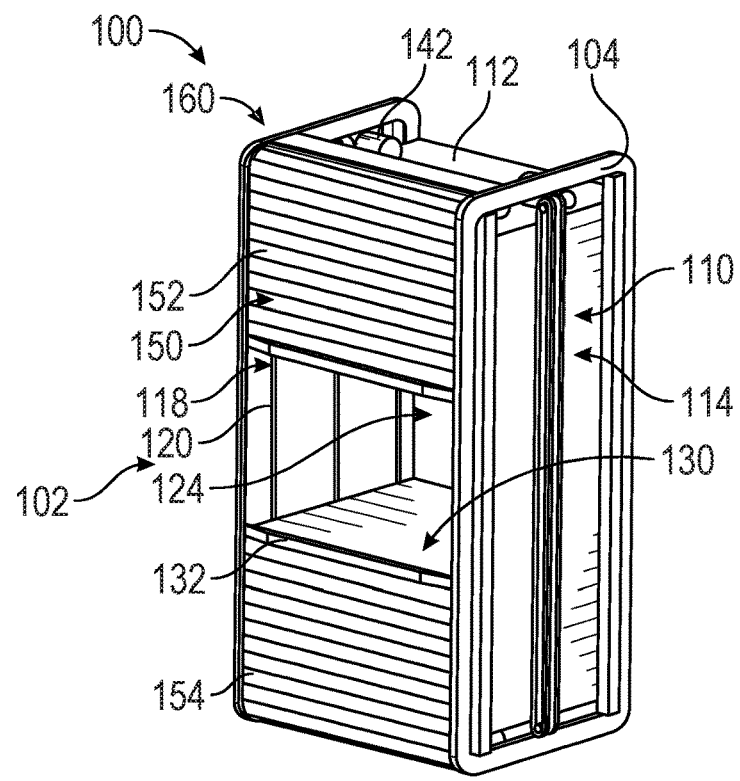
FIG. 1 depicts a locker in a partially open position in accordance with one or more embodiments of the disclosure.

The disclosure is related to one or more self-adjusting lockers configured to adjust the internal storage compartments of the locker to correspond to the size and shape of a particular package. For example, the locker may include a door and a plurality of adjustable storage compartments. In this manner, when a courier delivers a package, the courier communicates through manual or digital means to instruct the locker to adjust the internal storage compartment size to correspond to the size and shape of the delivered package. That is, the size and shape of the storage compartment may be optimized to the minimum amount of space necessary to store and transport the package therein. When a user approaches the self-adjusting locker with the correct key (e.g., digital or non-digital) to the locker, the door may actuate to expose only the particular internal storage compartment containing that user's delivered package. In other instances, the user may have to enter a code through a user interface for the door to open the storage compartment.

In some instances, the self-adjusting locker may be a stationary system. As used herein, the terms "self-adjusting locker" and "locker" may be interchangeable. For example, the locker may be anchored into the ground near a department store or grocery store for users to approach and access their packages. In other instances, the locker may be disposed within a vehicle. For example, the door to the locker may be exposed to the exterior of the vehicle. In this manner, the vehicle may be loaded with the package by an individual or machine, after which the vehicle may navigate to a particular destination where a user can access the locker outside of the vehicle.

In some instances, the vehicle may include a driver. In certain embodiments, the vehicle may be an autonomous vehicle. In some instances, the vehicle may be fully autonomous. In other instances, the vehicle may be remotely controlled, partially autonomous, or manually driven. The vehicle may be a car, a truck, or any other transportation vehicle. In some instances, the autonomous vehicle may be capable of navigating to a particular user to deliver the package. For example, the autonomous vehicle may be equipped with the locker configured to store the package that is accessible to the user upon arrival. In some instances, the vehicle may navigate to a residence, the user may approach the vehicle, and the user may open the locker to retrieve the secured package. In other instances, the vehicle may arrive at a commercial property. The vehicle may navigate to any commercial or residential location that a vehicle may deliver a package.

In certain embodiments, the locker may include a plurality of adjustable storage compartments configured to adjust to a package size. For example, the plurality of adjustable storage compartments may include a series of panels with a plurality of tracks and one or more shelves set within the panels. The shelves may be coupled to at least one motor configured to actuate the shelves within the panels. In this manner, the at least one motor may actuate the shelves along the plurality of tracks to form a storage compartment with the panels similar to the package size. In some instances, the plurality of adjustable storage compartments may be smaller than a cubic foot. In other instances, the plurality of adjustable storage compartments may be larger than a cubic foot. The adjustable storage compartments may be any suitable size, shape, or configuration.

In certain embodiments, the one or more shelves may actuate along the plurality of tracks towards or away from a bottom panel (e.g., away from the top panel). That is, the at least one motor may actuate a shelf in the one or more shelves towards the bottom panel to a static position within the plurality of adjustable storage compartments. The shelf, the series of panels, and the door may form one or more of the storage compartments of the locker. In other embodiments, the shelf may actuate from between the bottom panel and the top panel. In this manner, the shelf may form an upper and/or lower boundary of one or more storage compartments with the locker.

In certain embodiments, the locker may include a door configured to actuate between an open position and a closed position. That is, the door may be configured to actuate to the open position, thus exposing a particular storage compartment within the plurality of adjustable storage compartments. For example, the door may include a first portion and a second portion. Each door may be coupled to at least one motor. In this manner, the first portion and the second portion may actuate in conjunction with one another. In some instances, the first portion and the second portion may actuate together to the bottom of a particular storage compartment (e.g., or shelf within the plurality of adjustable storage compartments) within the plurality of adjustable storage compartments. The first portion may then actuate away from the second portion, and the second portion may remain static at the bottom of one storage compartment within the plurality of adjustable storage compartments. In this manner, only one storage compartment may be exposed. In other instances, the first portion and the second portion may expose more than one storage compartment within the plurality of storage compartments. In some instances, the door's open position may expose the entire locker.

In certain embodiments, the door may include a first portion and a second portion configured to move in two directions (e.g., towards a top panel and a bottom panel of the locker). In other embodiments, the door may include a third portion and a fourth portion configured to move in two directions (e.g., towards one of the plurality of side panels). That is, the first portion, the second portion, the third portion, and the fourth portion may move simultaneously so that the door moves in four directions.

In certain embodiments, the locker may include a frame. In some instances, the frame may couple to a series of panels. The frame may be two, opposed rectangular beams. In other instances, the frame may form a square, a circle, or another geometric shape. The frame may have a triangular, square, circular, rectangular, or some other shaped cross-section. The frame may be any suitable size, shape, or configuration.

In certain embodiments, the locker may include a series of panels. For example, the panels may be solid, rectangular sides to the locker. That is, the locker may include a top panel, a plurality of side panels, and a bottom panel. In this manner, the panels may form a box shape. In some instances, the panels may form a cube, a sphere, or some other geometric shape. In certain embodiments, the panels may include a plurality of tracks extending from the top panel to the bottom panel along the plurality of side panels. In some instances, the plurality of tracks may extend perpendicular along the plurality of side panels, and perpendicular to the top panel and the bottom panel. In other instances, the plurality of tracks may extend from the top panel to the bottom panel as well as perpendicular to the top panel and the bottom panel. In yet other instances, the plurality of tracks may extend along the top panel, the bottom panel, and/or the plurality of side panels in any direction. The plurality of tracks may be rectangular cross-sectional channels embedded within the series of panels. The plurality of tracks may be of some other cross-sectional area embedded within the panels, such as circular, triangular, or some other geometric shape. In some instances, the panels may include only one track along each panel. In other instances, the panels may include more than one track along each panel. In this manner, the tracks may be configured to receive dowels, anchors, hooks, or some other fastener disposed along one or more shelves.

In certain embodiments, the locker may include one or more shelves configured to adjust along the plurality of tracks. That is, each shelf may include a plurality of fasteners to secure the shelf along the plurality of tracks. For example, the one or more shelves may include dowels disposed along an edge of the one or more shelves to secure into the plurality of tracks. In other instances, the plurality of fasteners may be hooks, pins, balls, or some other fastener configured to complement and engage the plurality of tracks embedded in the series of panels. In certain embodiments, each shelf in the one or more shelves may be a solid, rectangular-shaped board. In other instances, each shelf may be a tambour panel configured to roll up. The shelf may be configured to fit within the panels. That is, the one or more shelves may be a planar surface to the top panel and the bottom panel. In this manner, the one or more shelves are on a parallel plane with the top panel and the bottom panel. In other instances, the shelf may be another geometric shape or orientation. In some instances, the plurality of adjustable storage compartments may include only one shelf. In other instances, the plurality of adjustable storage compartments may include more than one shelf.

In certain embodiments, the one or more shelves may include a partition. For example, the partition may be a board oriented in a perpendicular plane to the top panel and the bottom panel. In this manner, the partition may be disposed between two shelves parallel to the top panel and the bottom panel. That is, the partition may be a planar surface parallel to the plurality of side panels. The partition may include a plurality of fasteners to secure the partition along a plurality of shelf tracks. For example, the one or more shelves may each have a track extending between the plurality of side panels. The partition may include dowels disposed along an edge of the partition to secure into the plurality of tracks. In some instances, the plurality of fasteners may be hooks, pins, balls, or some other fastener configured to complement and engage the plurality of tracks embedded in the series of panels. In certain embodiments, each partition may be a solid, rectangular-shaped board. In other instances, the partition may be another geometric shape or orientation. In certain embodiments, the partition may include a securing arm. For example, the securing arm may protrude from one surface of the partition. The securing arm may be configured to contact a package as the partition actuates toward the package. In some instances, the securing arm may be rubber. In other instances, the securing arm may be plastic, metal, or another material. In certain embodiments, the series of panels may include a securing arm. For example, one of the plurality of side panels may include a securing arm opposite the securing arm on the partition. In this manner, a package may be secured between two securing arms within the locker.

In certain embodiments, the adjustable storage compartment adjusts between a secured position for securing the package within the adjustable storage compartment and an unsecured position for removing the package from the storage compartment. For example, the storage compartment may include the partition that actuates within the storage compartment. That is, the partition may slide along the plurality of tracks within the locker to adjust to the package size. The partition may slide between the plurality of side panels. In this manner, the partition and the series of panels adjust to the package size. In the secured position, the partition actuates along the plurality of tracks towards the package to secure the package within the storage compartment. In the unsecured position, the partition actuates along the plurality of tracks away from the package and/or one of the plurality of side panels. In some instances, the partition may divide the storage compartment. In other instances, the partition may be a side panel in the plurality of side panels.

In certain embodiments, the one or more shelves may actuate towards and away from the top panel and the bottom panel. That is, each shelf secured within the tracks may be coupled to at least one motor. In this manner, the motor may be configured to actuate the shelves within the plurality of adjustable storage compartments along the plurality of tracks. In some instances, the one or more shelves are static. In other instances, the shelves may move in three dimensions. In this manner, each shelf may be configured to be actuated from between the top panel and the bottom panel out of the plurality of adjustable storage compartments. Similarly, the partition may be coupled to at least one motor. The partition may be actuated along the plurality of tracks. In some instances, the partition may be static. In other instances, the partition may move in three dimensions. Each of the one or more shelves may be configured to align with the door.

In certain embodiments, the locker may include a door coupled to the locker and configured to actuate between an open position and a closed position. For example, the door may include a first portion coupled to the top panel of the series of panels and a second portion coupled to the bottom panel. Each door may be coupled to at least one motor. Each motor may be configured to actuate the door where each door may actuate simultaneously. In other instances, each door may actuate alone. In this manner, the door may be configured to actuate between the open position and the closed position. That is, the series of panels, the one or more shelves, and the door may form at least one storage compartment of the locker. In the open position, the door may expose the storage compartment of the locker to the environment surrounding the locker. In the closed position, the door may enclose the storage compartment of the locker. In some instances, the first portion may be configured to actuate towards and away from the second portion. Similarly, the second portion may be configured to actuate towards and away from the first portion. In certain embodiments, the first portion and the second portion may actuate together in a closed position to a first shelf within the plurality of adjustable storage compartments. The first portion may actuate away from the second portion, and the second portion may remain static. The first portion may actuate away from the first shelf to a second shelf above the first shelf. In this manner, the locker may be in the open position. That is, a user may insert or remove a package from between the first shelf and the second shelf.

In certain embodiments, the door may include a third portion and a fourth portion. The third portion and the fourth portion may be configured to actuate between an open position and a closed position. For example, the third portion may be coupled to a first side panel, and the fourth portion may be coupled to a second side panel. In this manner, the third portion may be configured to actuate towards and away from the fourth portion. Similarly, the fourth portion may be configured to actuate towards and away from the third portion. In some instances, the third portion and the fourth portion may each be coupled to at least one motor. Each motor may be configured to actuate the third portion and the fourth portion simultaneously. In other instances, each of the third portion and the fourth portion may actuate alone. In the open position, the third portion and the fourth portion may expose the storage compartment of the locker to the environment surrounding the locker. In the closed position, the third portion and the fourth portion may enclose the storage compartment of the locker. In certain embodiments, the third portion may actuate away from the fourth portion, and the fourth portion may remain static. In other instances, the fourth portion may actuate away from the third portion, and the third portion may remain static. In yet other instances, the third portion and the fourth portion may actuate together. In certain embodiments, the first portion, the second portion, the third portion, and the fourth portion may couple to the locker and be configured to actuate between an open position and a closed position. For example, one or more shelves and a partition may form a storage compartment with the series of panels. The door may actuate to an open position, exposing the storage compartment formed by the one or more shelves, the partition, and the series of panels. In this manner, when the door is in the open position the storage compartment may be exposed to the exterior of a vehicle. In other instances, the door may actuate to a closed position, enclosing the storage compartment formed by the one or more shelves, the partition, and the series of panels. Each door may be composed of a tambour door. That is, the door may be configured to be flexible. In this manner, the door may be configured to meander along a track. In other instances, each door may be a solid, continuous surface.

In certain embodiments, the door includes at least one belt configured to actuate the door between the open position and the closed position. For example, the at least one belt may attach to a gear. The gear may be attached to a motor. In this manner, as the motor turns the gear, the belt may actuate the door between the open position and the closed position. The door may actuate to an open position exposing the interior of the storage compartment. The door may actuate to a closed position sheltering the interior of the storage compartment. In some instances, the door may actuate to a partially open position. For example, the door may actuate to the partition location within the locker or storage compartment. That is, the partition may actuate to shrink the storage compartment size, and the door may actuate to a position of the partition. In other instances, the door may actuate to an open position for the entire storage compartment. In certain embodiments, the locker may include a plurality of doors attached to at least one belt. In some instances, the plurality of doors may actuate to the open position, the closed position, or the partially open position together. In other instances, the plurality of doors may individually actuate to the open position, the closed position, or the partially open position. In certain embodiments, the door may actuate to the open position for one storage compartment in the locker. In other embodiments, the door may actuate to the open position for more than one storage compartment in the locker. In yet other embodiments, the door may extend around the locker and attach to the gear. The gear may actuate the door between the open position and the closed position.

In certain embodiments, accessing the self-adjusting locker may include a method for a user. For example, the method may include a user selecting a package size and shape via a user interface. That is, the user interface may allow the user to choose a size for a package within the self-adjusting locker. The user interface may be on a cellular telephone, a computer, or some other communication device. The instructions given by the user to the user interface may be communicated with the self-adjusting locker. The self-adjusting locker may then actuate the plurality of adjustable storage compartments to complement the package size. In some instances, as the user approaches, the locker may actuate the door to expose one of the adjustable storage compartments to the package size. The user may then place or remove the package within the plurality of adjustable storage compartments. The door may then close the opening into the plurality of adjustable storage compartments. In some instances, the user may remove a package stored within the plurality of adjustable storage compartments. One of the adjustable storage compartments may then actuate to another internal size to prepare for another package or remain static.

Illustrative Embodiments

Figure 2:
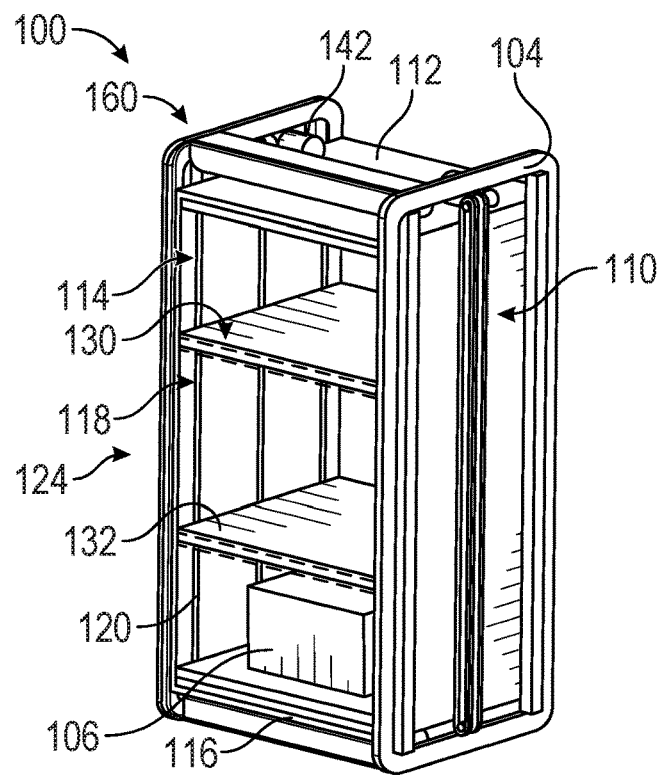
FIG. 2 depicts the locker in a fully open position in accordance with one or more embodiments of the disclosure.

Turning now to the drawings, FIG. 1 depicts a locker 100 configured to store a package 106 (e.g., as shown in FIG. 2). The locker 100 may include a frame 104 and a series of panels 110. The frame 104 may include two rectangular bars disposed opposite to one another. The frame 104 may be any suitable size, shape, or configuration. In this manner, the series of panels 110 may be coupled to and between the frame 104. For example, the series of panels 110 may be attached to the frame 104 by fasteners, adhesives, or other means. The series of panels 110 may come together to form an open, rectangular prism. In other instances, the series of panels 110 may form another geometric shape. In some instances, the series of panels 110 may include a top panel 112, a plurality of side panels 114, and a bottom panel 116 (e.g., as shown in FIG. 2). In other instances, the series of panels 110 may include more or less panels.

In some embodiments, as shown in FIG. 1, the series of panels 110 may include a plurality of tracks 118. The plurality of tracks 118 may be disposed along the surface of the plurality of side panels 114. That is, the plurality of tracks 118 may extend between the bottom panel 116 to the top panel 112. In some instances, the plurality of tracks 118 may extend in any direction along any of the series of panels 114. The plurality of tracks 118 may be rectangular channels embedded within the series of panels 114. In other instances, the plurality of tracks 118 may be some other cross-sectional shape. In this manner, the plurality of tracks 118 may be configured to receive a plurality of fasteners disposed along the one or more shelves 130. The plurality of tracks 118 may be configured to guide the one or more shelves 130 and the partitions with the at least one motor 142. That is, the at least one motor 142 may be configured to actuate the one or more shelves 130 via the plurality of tracks 118. In other instances, the at least one motor 142 may be configured to actuate the door.

In some embodiments, the plurality of adjustable storage compartments 102 may include one or more shelves 130 configured to adjust along the plurality of tracks 118. That is, the one or more shelves 130 may include a shelf 132 configured to actuate towards or away from the top panel 112, the bottom panel 116, or the other shelves within the locker 100. Each shelf 132 within the one or more shelves 130 of the plurality of adjustable storage compartments 102 may include a planar surface parallel with the top panel 112 and the bottom panel 116. In some instances, the shelf 132 may be a rectangular surface. In other instances, the shelf 132 may be another geometric shape within the plurality of adjustable storage compartments 102. In some instances, the one or more shelves 130 may include two or more shelves. In other instances, the one or more shelves 130 may include only one shelf. As shown in FIG. 1, the one or more shelves 130 may actuate over one another within the series of panels 110 to form at least one storage compartment 124. The at least one storage compartment 124 may complement a package size determined by a user, a program, or some other input to the plurality of adjustable storage compartments 102. In some embodiments, as shown in FIG. 2, the one or more shelves 130 may actuate over one another within the series of panels 110 to form more than one storage compartment 124.

In some embodiments, the locker 100 may include at least one motor 142. The at least one motor 142 may be an electric motor coupled to the plurality of tracks 118. In other embodiments the motor 142 may be a different type of motor configured to actuate components within the plurality of adjustable storage compartments 102. The motor 142 may be configured to actuate the one or more shelves 130 along the plurality of tracks 118. That is, the at least one motor 142 may include a pulley system coupled to the plurality of fasteners disposed on the one or more shelves 130 to actuate the shelves. In some instances, the at least one motor 142 may be coupled to a belt to guide the one or more shelves 130 along the plurality of tracks 118. In this manner, the motor 142 actuates the one or more shelves 130 to form at least one storage compartment 124 within the locker 100. As the motor 142 actuates a shelf 132, the at least one storage compartment 124 increases or decreases the size between the shelves 130 and the panels 110. In some instances, one motor 142 may be coupled to the door 150 and may be configured to actuate the first portion 152 and the second portion 154. The locker 100 may include one motor 142 for each portion of the door 150. In other instances, the locker 100 may include one motor 142 configured to actuate and/or rotate all of the components (e.g., the door, the shelves) on the locker 100.

Figure 3:
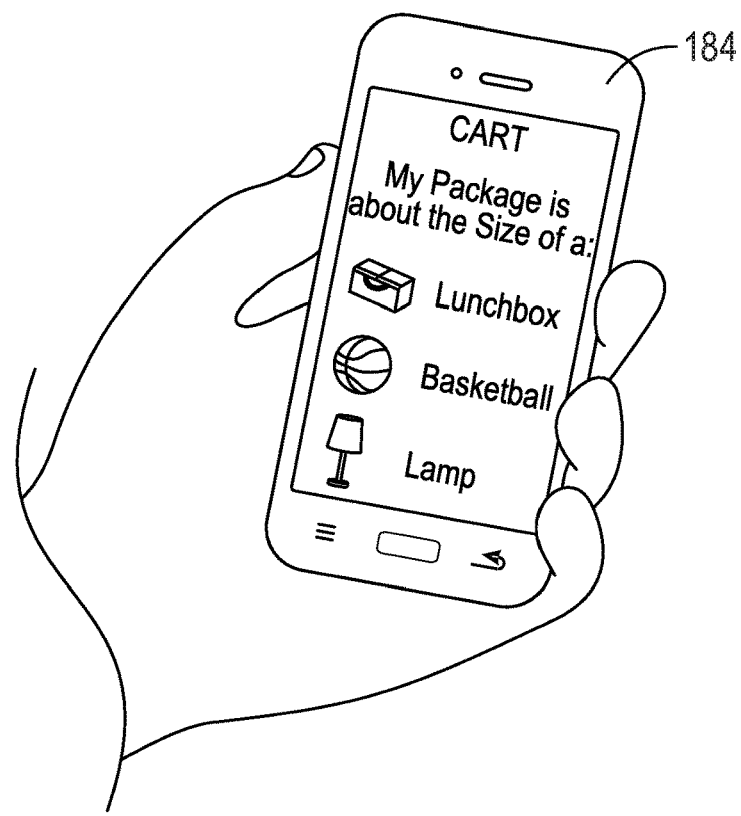
FIG. 3 depicts a user interface in accordance with one or more embodiments of the disclosure.

In some embodiments, as shown in FIG. 3, the locker may be in communication with a user device with a user interface 184 configured to select a package size. The user interface 184 may have a plurality of size options for a user to select. In some instances, the user may pick a small, a medium, or a large package size for the plurality of adjustable storage compartments to adjust accordingly. That is, the size of the package selected by the user may correspond to one or more storage compartment configurations. In this manner, when the user selects a package size, one or more of the storage compartments may be adjusted to closely match the size and shape of the package.

Figure 5:
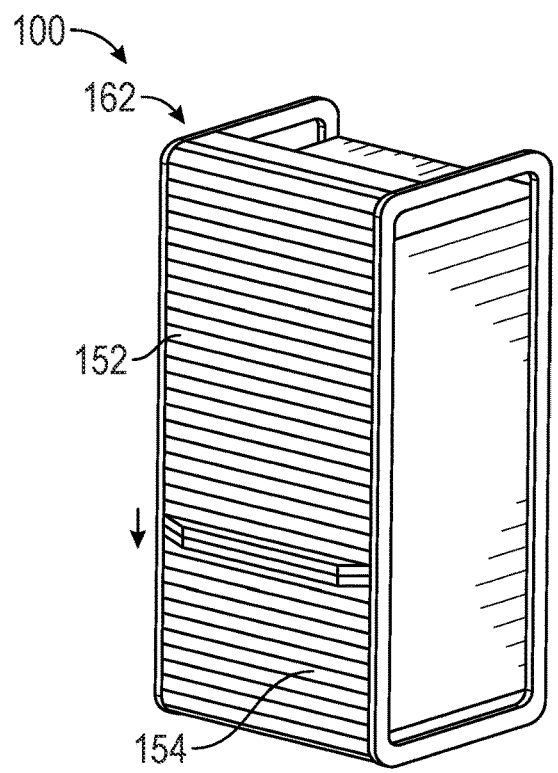
FIG. 5 depicts the locker in a closed position in accordance with one or more embodiments of the disclosure.
Figure 6:
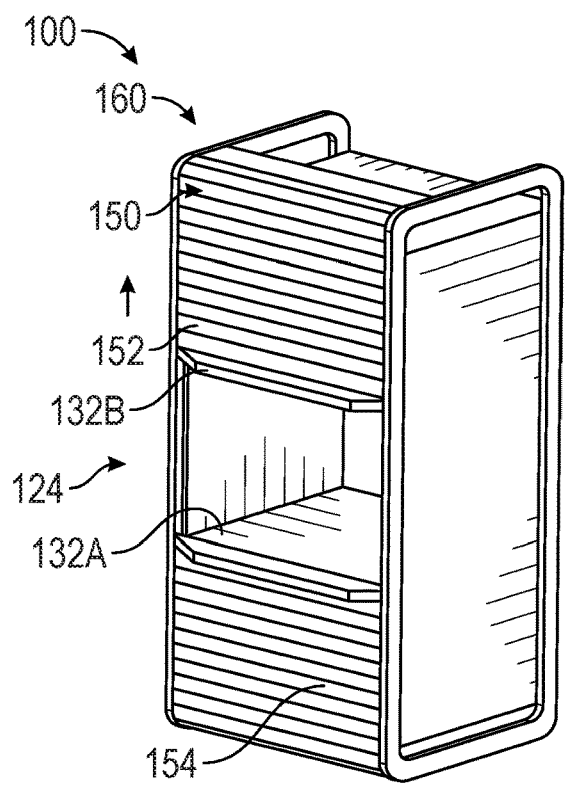
FIG. 6 depicts the locker in a partially open position in accordance with one or more embodiments of the disclosure.
Figure 7:
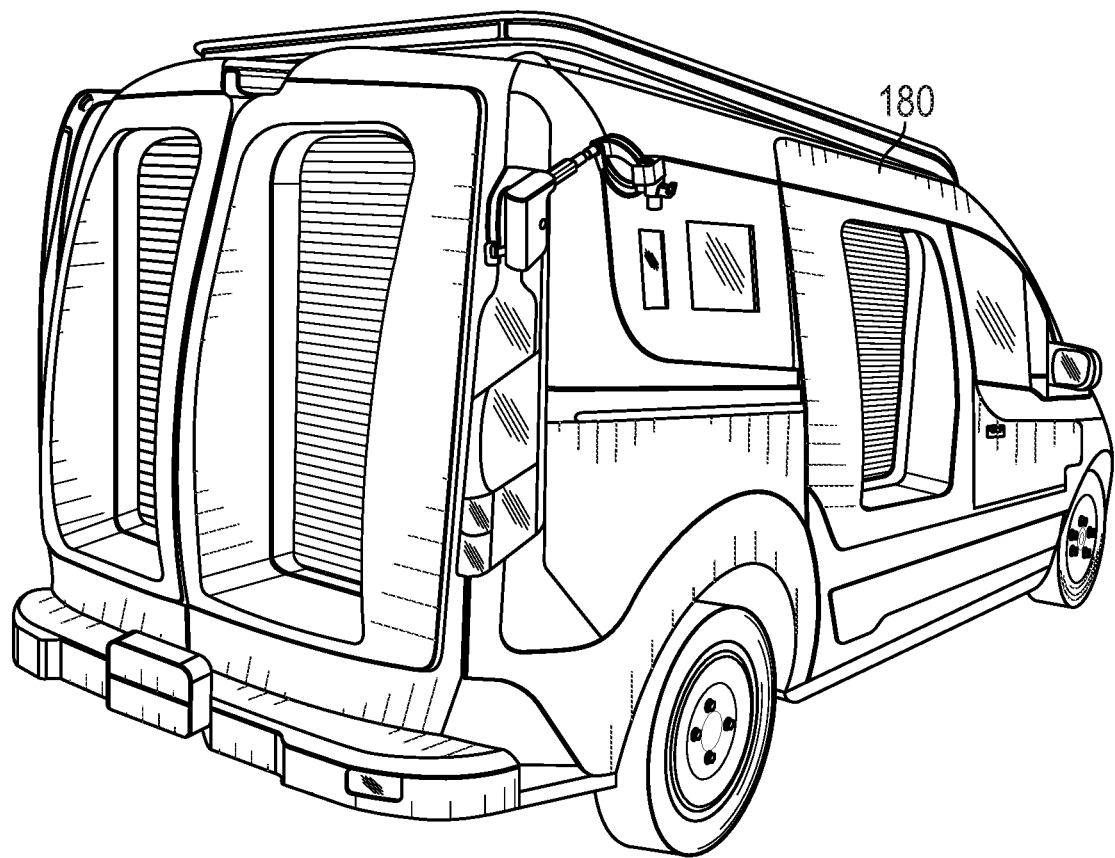
FIG. 7 depicts a vehicle and a locker in accordance with one or more embodiments of the disclosure.

In some embodiments, as shown in FIGS. 5 and 6, the locker 100 may include a door 150 configured to actuate between an open position 160 and a closed position 162. For example, the door 150 may include a first portion 152 and a second portion 154. In some instances, the first portion 152 is configured to actuate towards and away from the second portion 154. The second portion 154 may be configured to actuate towards and away from the first portion 152. That is, the at least one motor 142 (e.g., as shown in FIG. 1) may actuate each portion of the door 150. In this manner, as shown in FIG. 5, the first portion 152 and the second portion 154 may actuate together in a closed position 162. That is, the storage compartments formed by the one or more shelves are covered by the door 150. In some instances, the door 150 may be opened and closed to access the inside of the storage compartments 124. As shown in FIG. 6, the second portion 154 may remain static at a first shelf 132A and the first portion 152 may actuate towards a second shelf 132B. In some instances, the first portion 152 may remain static at the second shelf 132B, and the second portion 154 may actuate towards the first shelf 132A. In some embodiments, as shown in FIGS. 5 and 6, the door 150 may be composed of a tambour door. That is, the door 150 may be configured to roll into a cylindrical shape. In other instances, the door 150 may be a door of another type of material and structure. The door may be transparent or opaque.

Figure 8:
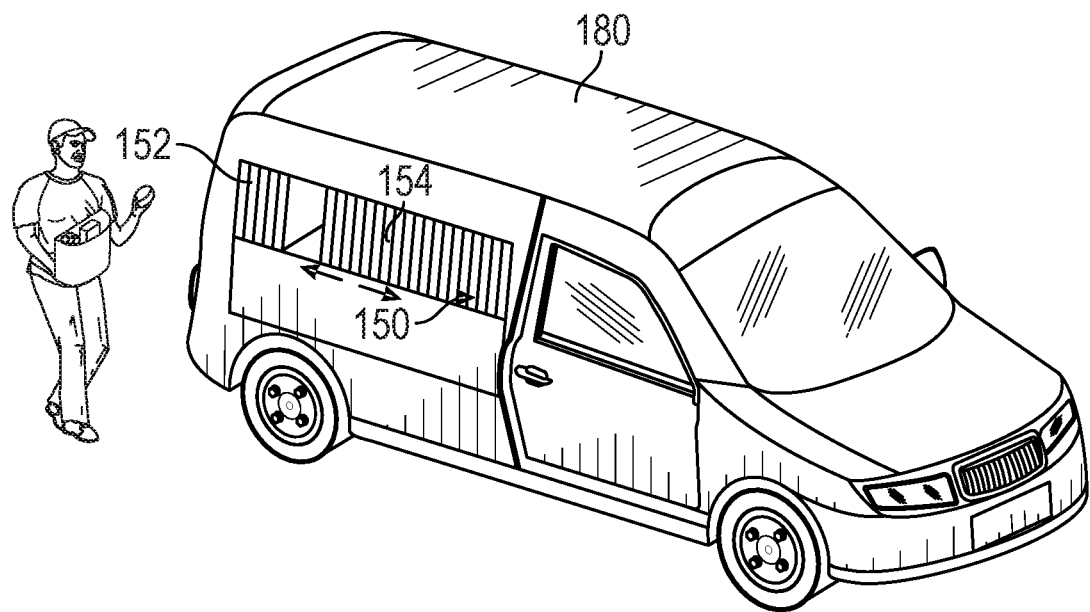
FIG. 8 depicts a vehicle and a locker in accordance with one or more embodiments of the disclosure.

In some embodiments, as shown in FIG. 8, the door 150 may be configured to actuate towards and away from the plurality of side panels 114. That is, the one or more shelves 130 within the locker 100 may extend laterally to be partitions within the locker 100. In some instances, the panels may adjust to change the size (e.g., the volume) of the storage compartments. In this manner, the first portion 152 and the second portion 154 may actuate side to side. In some instances, the locker 100 may be disposed on the side of a vehicle 180. In other instances, the locker 100 may be a stand-alone locker outside of a vehicle, a store, or a residence.

Figure 9:
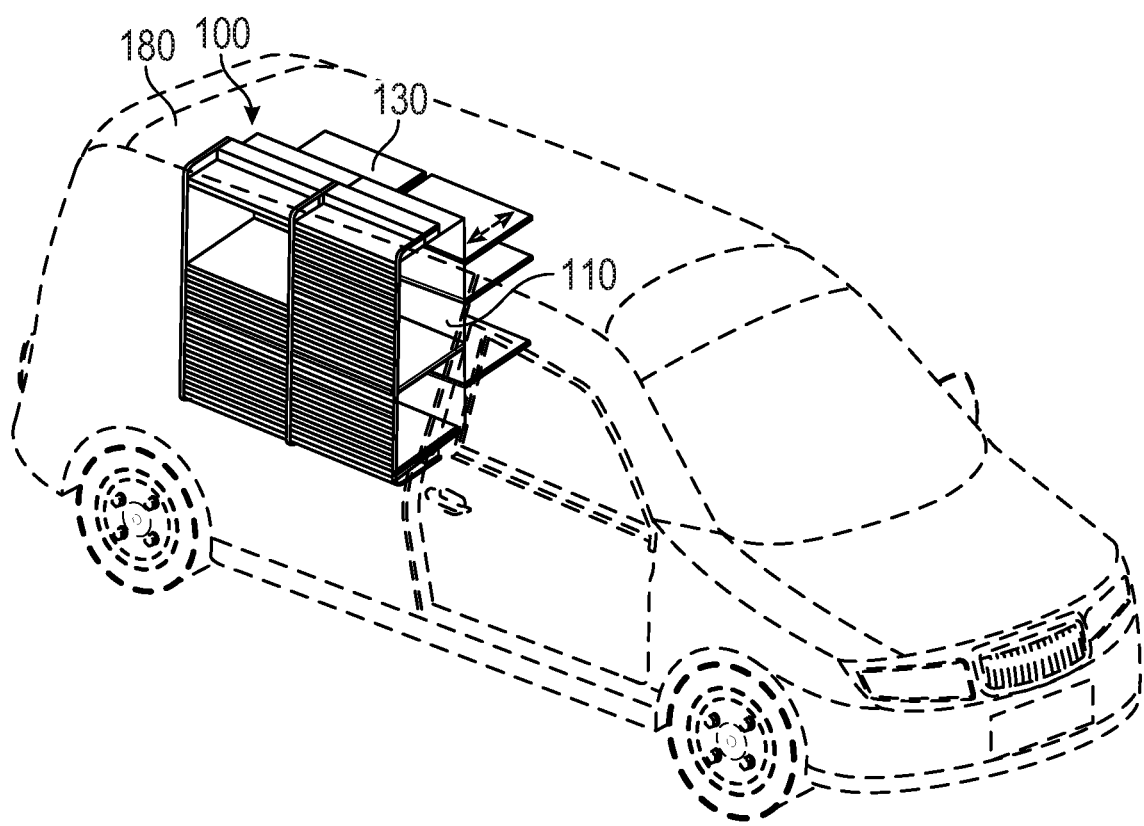
FIG. 9 depicts a series of lockers and a vehicle in accordance with one or more embodiments of the disclosure.
Figure 10:
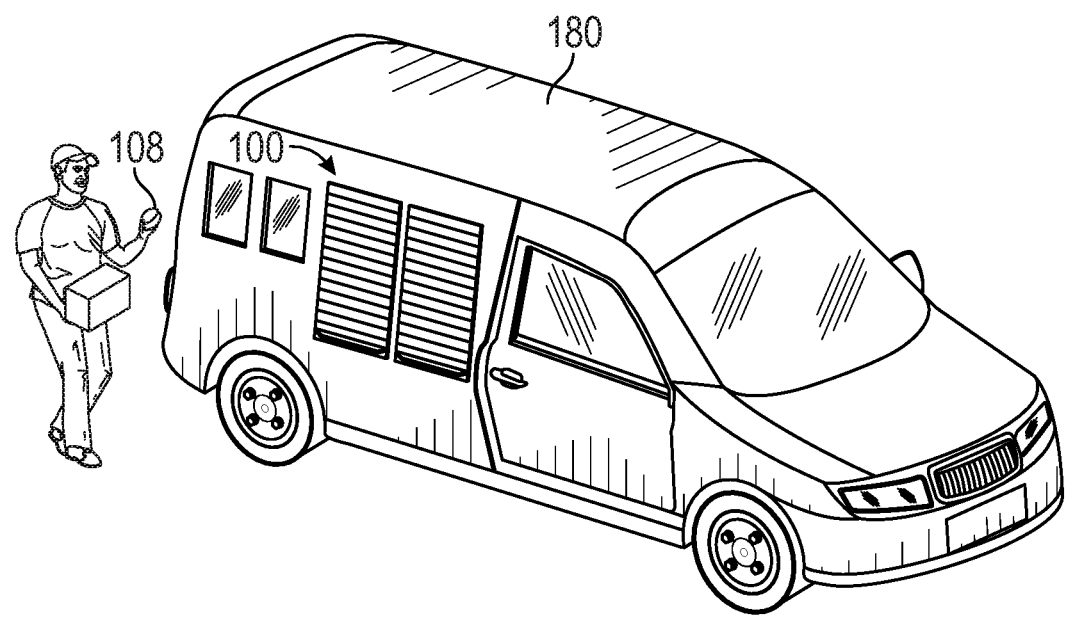
FIG. 10 depicts a series of lockers and a vehicle in accordance with one or more embodiments of the disclosure.
Figure 11:
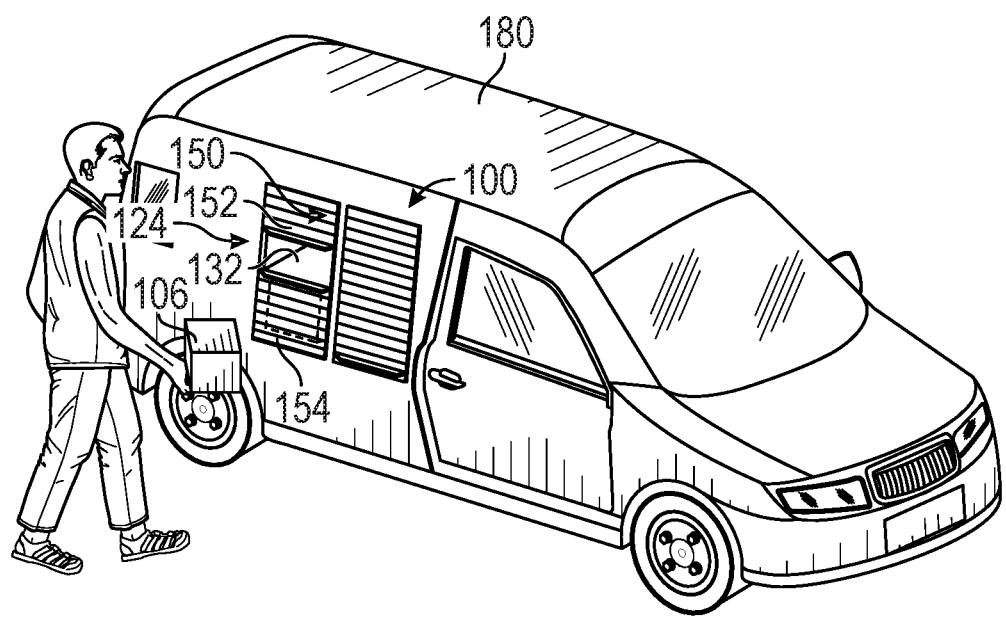
FIG. 11 depicts a user and a series of lockers in accordance with one or more embodiments of the disclosure.
Figure 12:
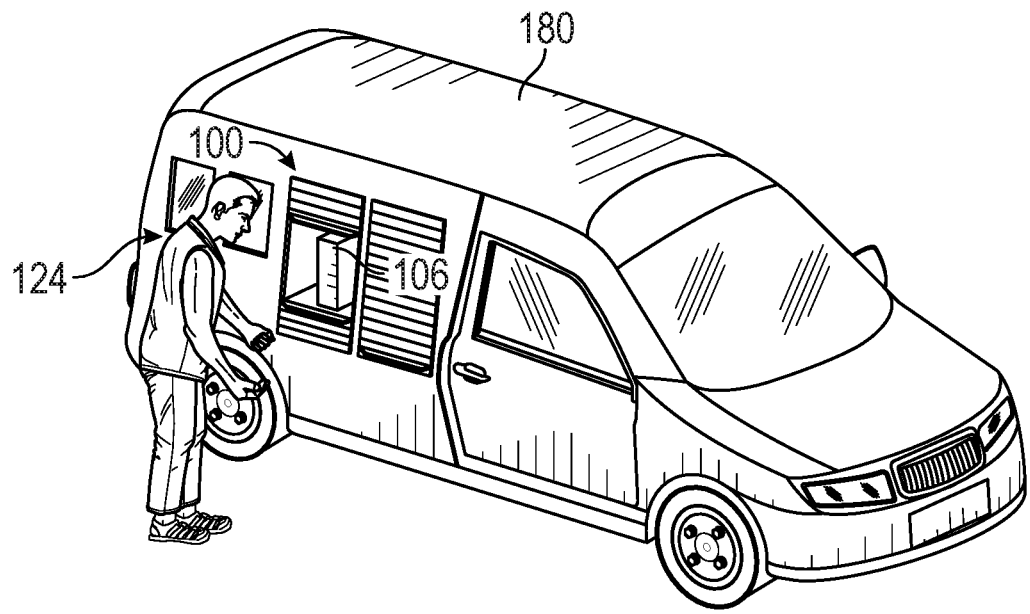
FIG. 12 depicts a package and a series of lockers in accordance with one or more embodiments of the disclosure.
Figure 13:
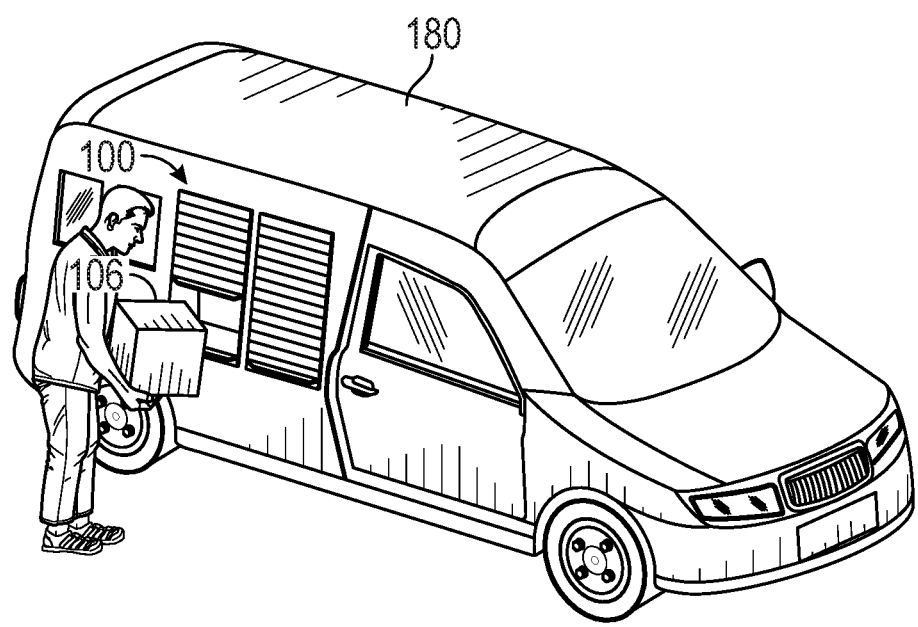
FIG. 13 depicts a series of lockers in accordance with one or more embodiments of the disclosure.
Figure 14:
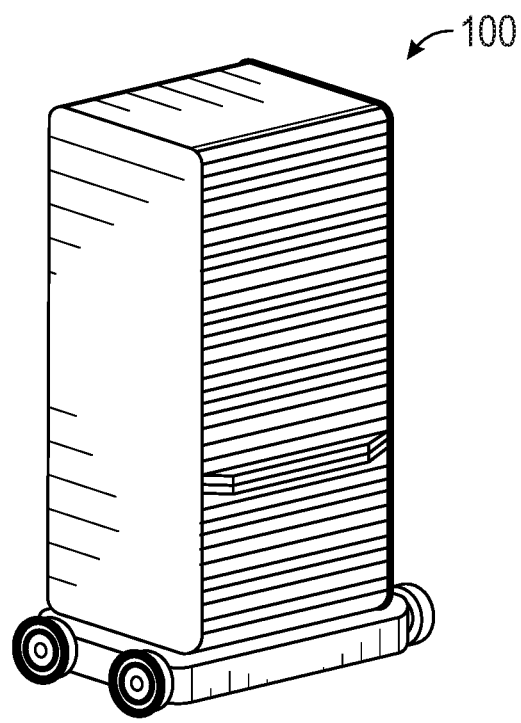
FIG. 14 depicts a locker in accordance with one or more embodiments of the disclosure.
Figure 15:
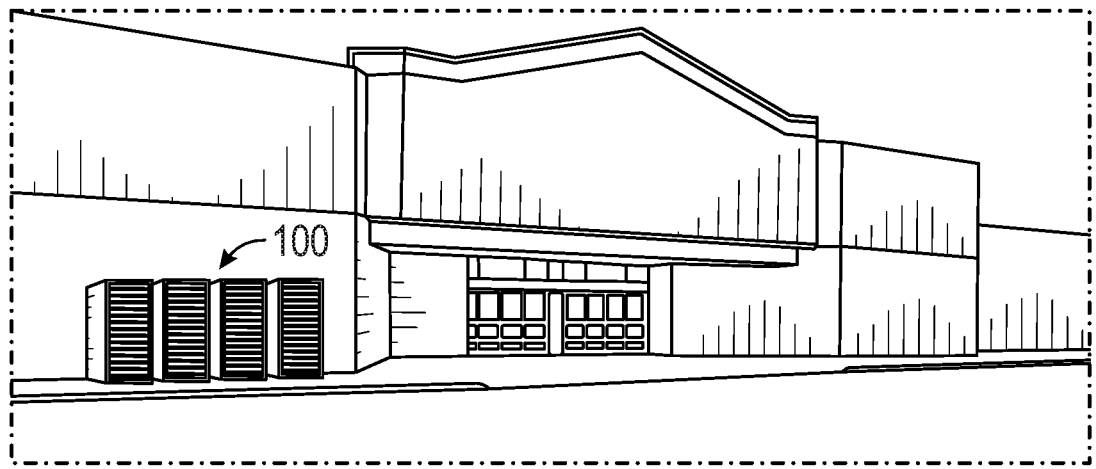
FIG. 15 depicts a series of lockers in accordance with one or more embodiments of the disclosure.

In some embodiments, as shown in FIG. 9, the one or more shelves 130 may be removed from the locker. That is, the shelves 130 may disengage from the series of panels 110. In this manner, the shelves 130 may actuate from within the panels 110 to create a larger storage compartment between the shelves and the panels 110. As depicted in FIG. 9, the shelves 130 may be removed from within the panels 110 and may be stored within a vehicle 180. In some instances, the shelves 130 may rotate within the panels 110 or the locker 100. That is, the shelves 130 may rotate to mimic a partition or rotate to provide space between the panels 110 on either side of the shelves. In other instances, the shelves may be static.

Figure 4:
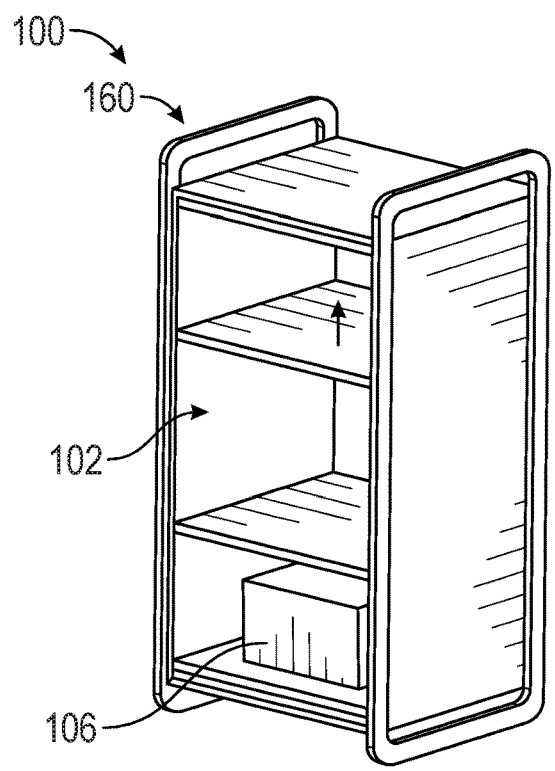
FIG. 4 depicts a locker in a fully open position in accordance with one or more embodiments of the disclosure.

FIGS. 10-13 depict the method of placing a package 106 within a locker 100. For example, a user may approach a vehicle 180 with a communication device 108. As shown in FIG. 3, the user may input a particular package size into the user interface 184. The locker 100 and the plurality of adjustable shelves 130 may adjust to the particular package size. The first portion 152 and the second portion 154 of the locker 100 may adjust to a particular shelf 132 in the plurality of adjustable shelves 130. In some instances, the first portion 152 may open to reveal at least one storage compartment 124 formed between the two shelves. In other instances, the first portion 152 and the second portion 154 may actuate to a completely open position 160 (e.g., as shown in FIG. 4) revealing the entire storage compartment 102.

Figure 16A:
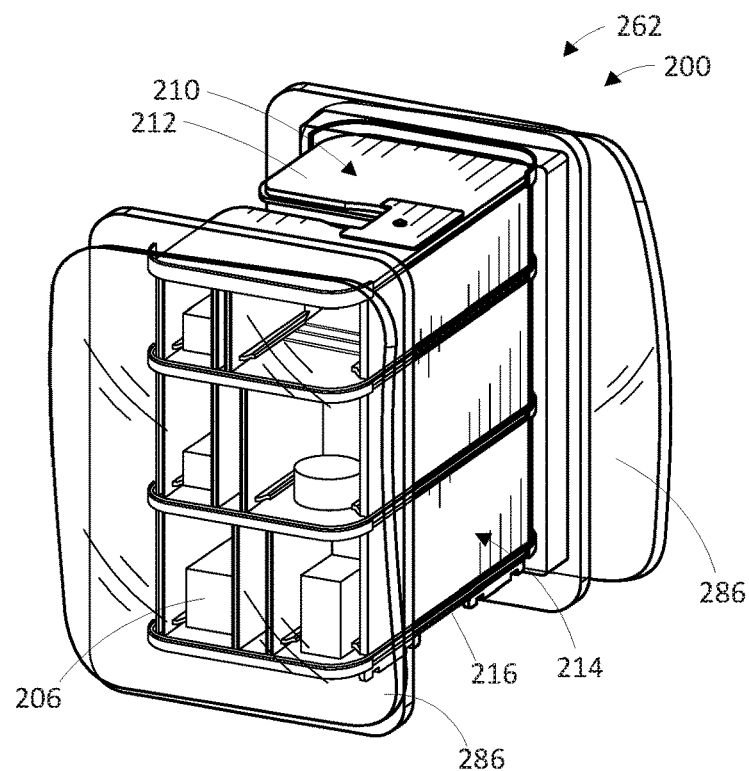
FIG. 16A depicts a locker in accordance with one or more embodiments of the disclosure.
Figure 16B:
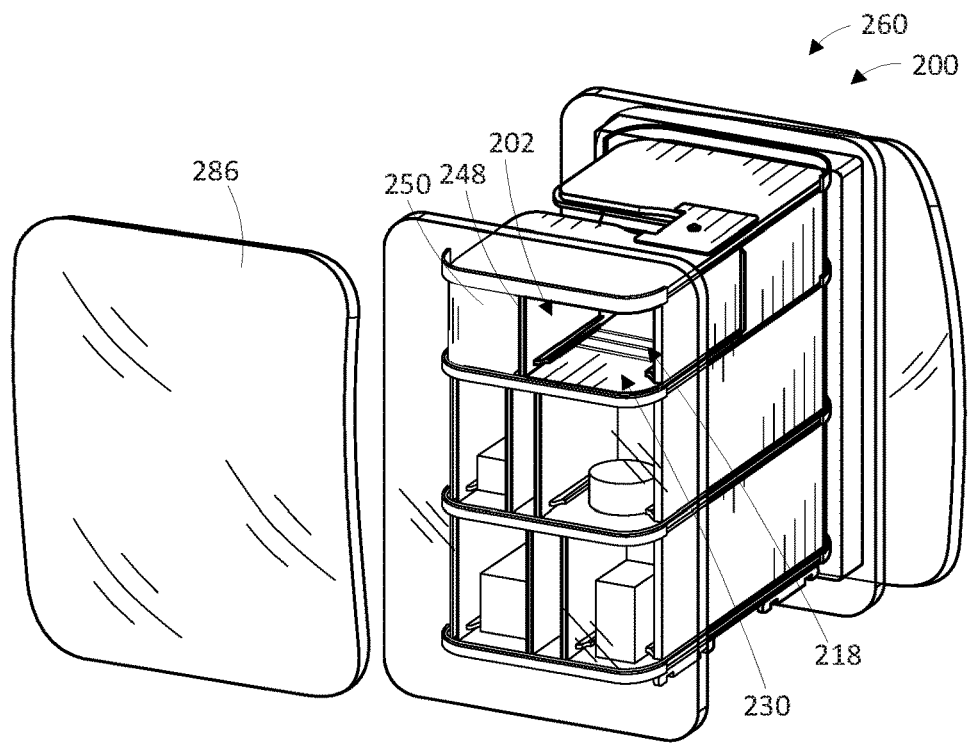
FIG. 16B depicts the locker in accordance with one or more embodiments of the disclosure.

In some embodiments, as shown in FIGS. 16A and 16B, a locker 200 includes an adjustable storage compartment 202. For example, the storage compartment 202 may include a partition 248 configured to actuate along a set of shelves 230 within a plurality of tracks 218. That is, the partition 248 may adjust the size of the storage compartment 202 to complement the size of a package. In some instances, the storage compartment 202 may include a series of panels 210. The series of panels 210 may include a top panel 212, a plurality of side panels 214, and a bottom panel 216. In some embodiments, the locker 200 is disposed between one or more vehicle doors 286. That is, the locker 200 may be disposed within a vehicle and the vehicle doors 286 may actuate to expose the locker to the exterior of the vehicle. In some instances, the vehicle door(s) 286 may coordinate with the locker door to the open position. Similarly, the vehicle door(s) 286 may coordinate with the locker door to the closed position.

Figure 17A:
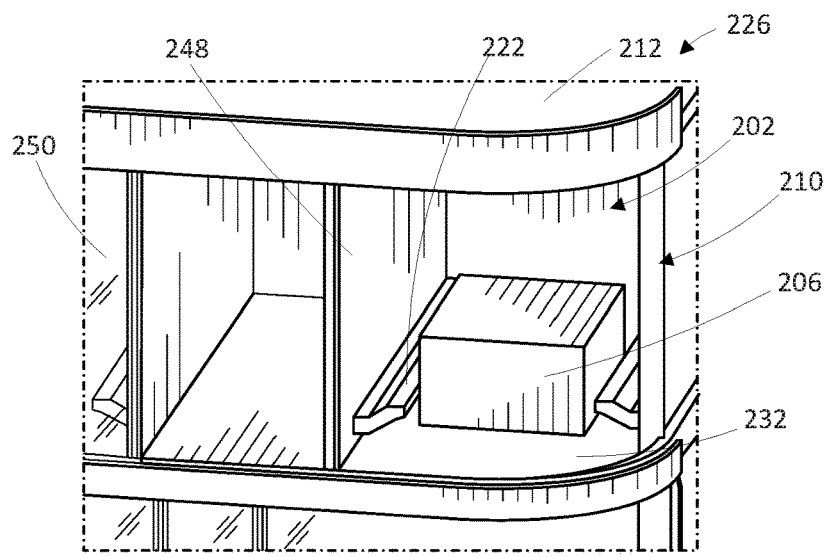
FIG. 17A depicts a storage compartment in a secured position in accordance with one or more embodiments of the disclosure.
Figure 17B:
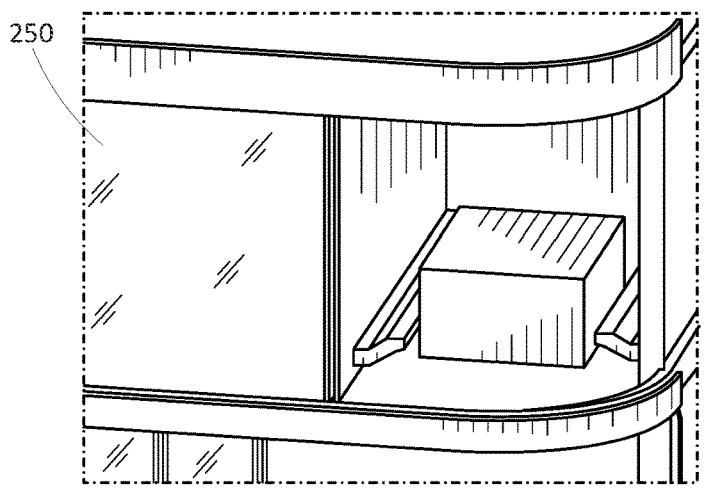
FIG. 17B depicts the storage compartment in the secured position in accordance with one or more embodiments of the disclosure.
Figure 17C:
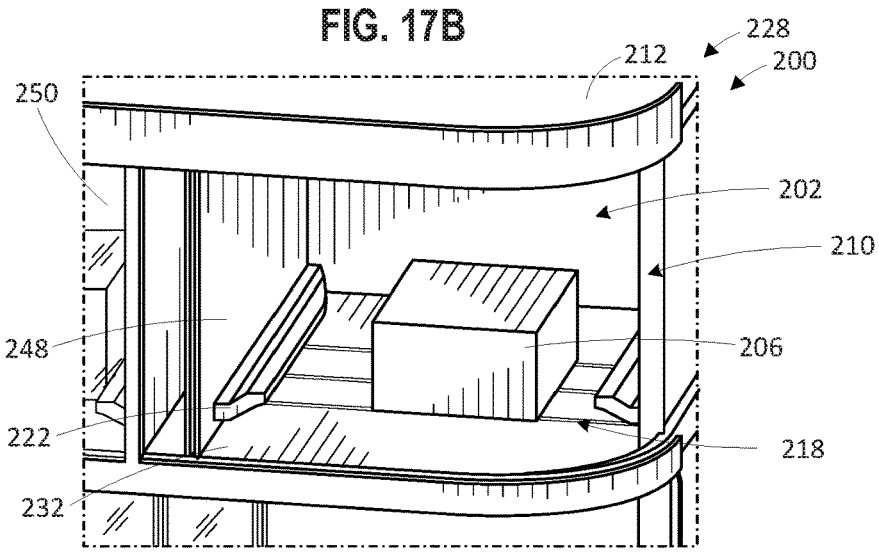
FIG. 17C depicts the storage compartment in an unsecured position in accordance with one or more embodiments of the disclosure.

In some embodiments, as shown in FIGS. 17A-17C, the locker 200 and storage compartment 202 actuate between a secured position 226 and an unsecured position 228. That is, the storage compartment 202 may be configured to actuate between a secured position 226 and an unsecured position 228. That is, in the secured position 226, the package 206 is secured within the locker 200. In the unsecured position 228, the package 206 is unsecured within the locker 200. In some instances, the secured position 226 may correspond to the door 250 being in a closed position 262 (e.g. as shown in FIG. 16A) and the unsecured position 228 corresponds to the door 250 being in an open position 260 (e.g. as shown in FIG. 16B). For example, the door 250 may be in the open position 260, and the user may place a package 206 within the locker 200. The package 206 may be of various sizes and shapes. In other instances, the secured position 226 may correspond to the partition 248 actuating along the plurality of tracks 218 to contact the package 206 via the securing arm 222. Conversely, the unsecured position 228 may correspond to the partition 248 actuating along the plurality of tracks 218 away from the package 206.

Figure 18A:
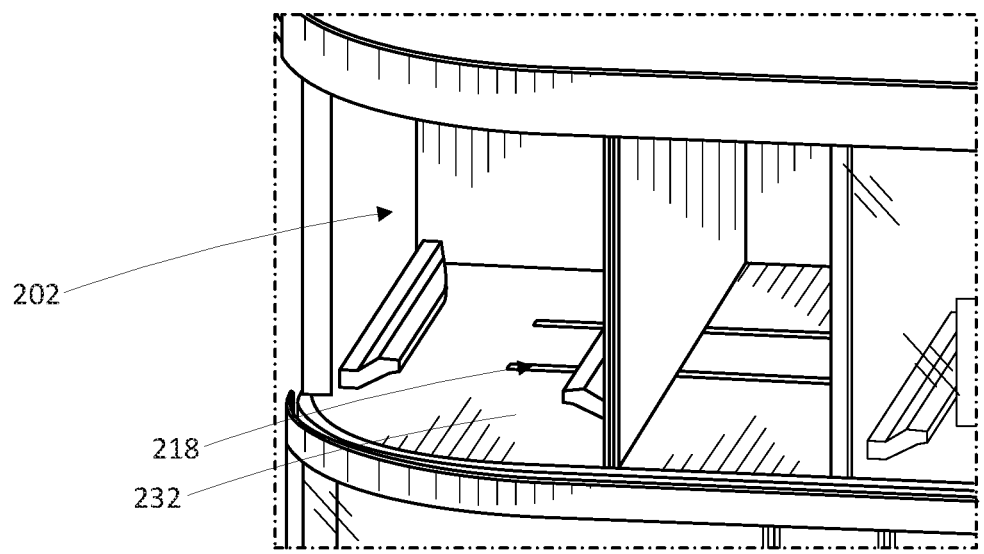
FIG. 18A depicts the storage compartment in the unsecured position in accordance with one or more embodiments of the disclosure.
Figure 18B:
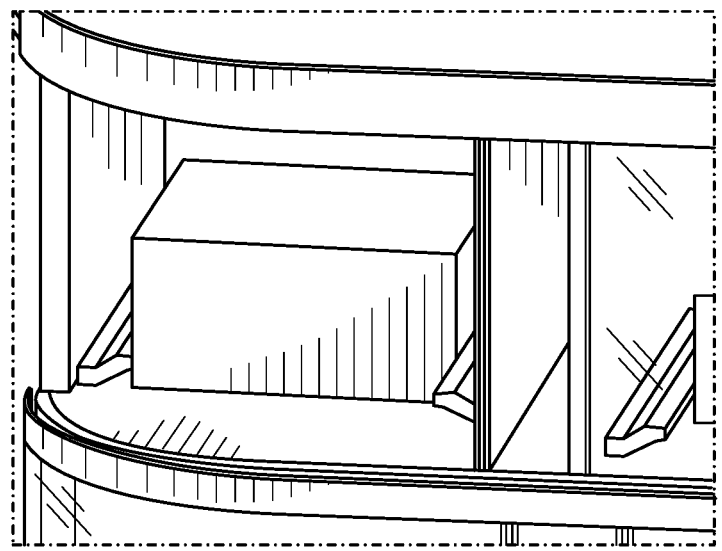
FIG. 18B depicts the storage compartment in the secured position in accordance with one or more embodiments of the disclosure.

In some embodiments, a shelf 232 within the storage compartment 202 includes a plurality of tracks 218 (e.g., as shown in FIG. 18A). As previously stated, the partition 248 may be disposed within the plurality of tracks 218. The partition 248 may be guided along the plurality of tracks 218 via one or more fasteners. In some instances, the partition 248 may actuate via one or more motors via a belt. In other instances, the partition 248 may actuate manually.

In some embodiments, the securing arm 222 may be disposed on the partition 248. For example, the securing arm 222 may protrude within the storage compartment 202 and be configured to contact the package 206. In some instances, the securing arm 222 may be rigid. In other instances, the securing arm 222 may be flexible.

Figure 19A:
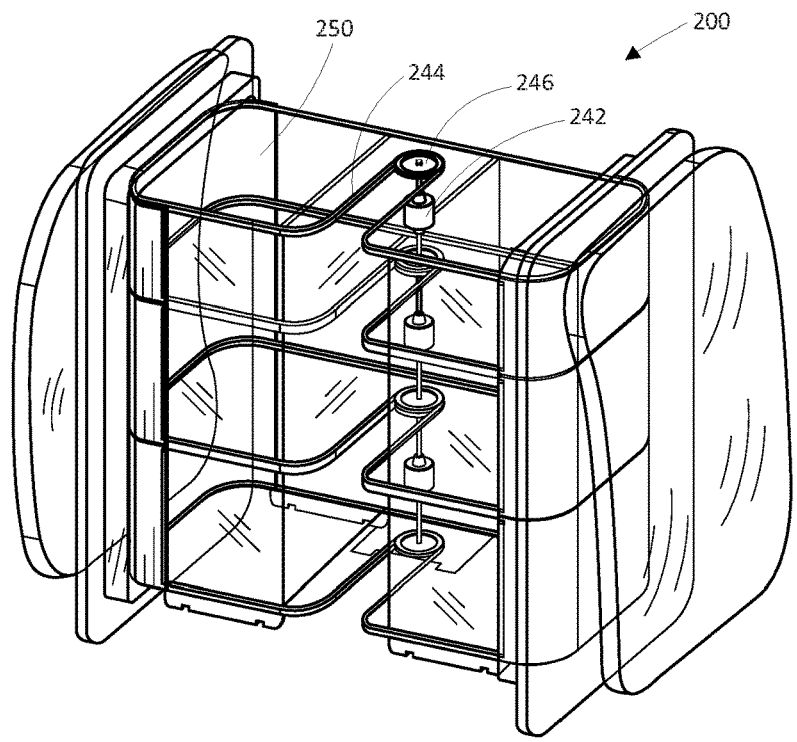
FIG. 19A depicts a series of lockers in a closed position in accordance with one or more embodiments of the disclosure.
Figure 19B:
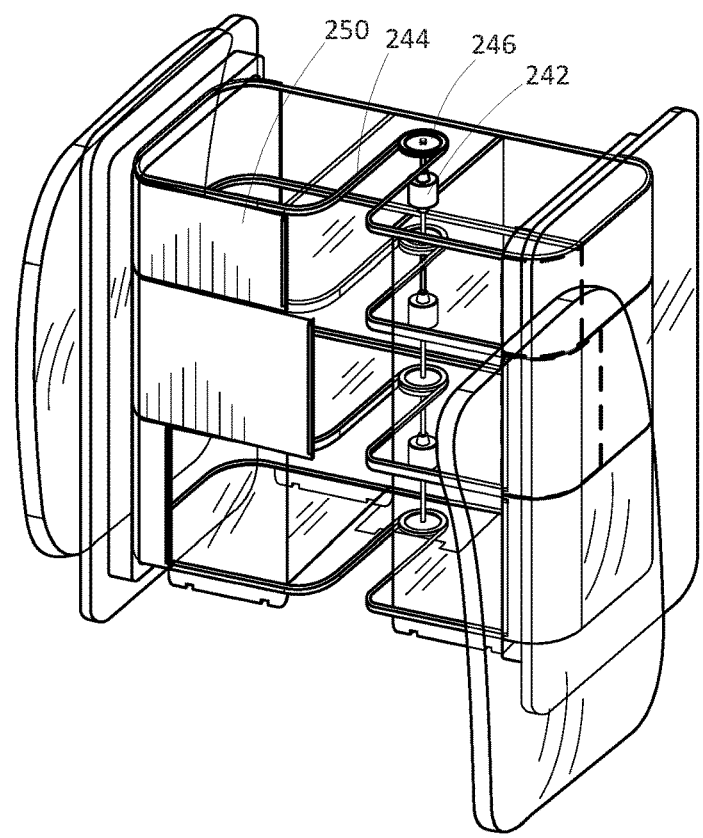
FIG. 19B depicts the series of lockers in a partially open position in accordance with one or more embodiments of the disclosure.
Figure 19C:
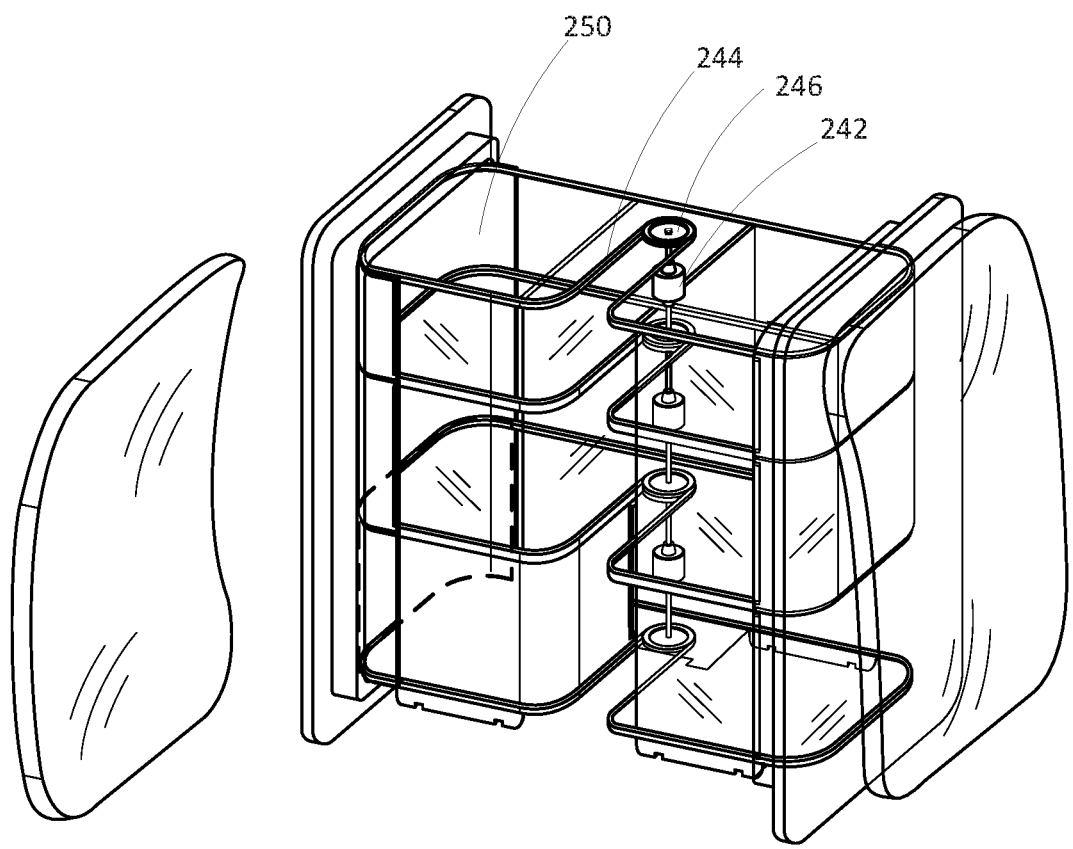
FIG. 19C depicts the series of lockers in the partially open position in accordance with one or more embodiments of the disclosure.

In some embodiments, as shown in FIGS. 19A-19C, the door 250 is actuated around the locker 200 via at least one belt 244. For example, the door 250 may be a tambour door configured to meander around the locker 200. The belt 244 may be disposed around the locker 200 and guide the door 250 between the open position and the closed position. In some instances, the belt 244 may be actuated by a gear 246 rotated by at least one motor 242. In other instances, the belt 244 may actuate about the locker 200 by another method. The door 250 may be in a closed position (e.g., as shown in FIG. 19A) and actuate into the open position (e.g., as shown in FIG. 19B). The door 250 may actuate any distance along the belt 244 to a variety of open positions exposing the storage compartment (e.g., as shown in FIG. 16B).

Example Embodiments

In some instances, the following examples may be implemented together or separately by the systems and methods described herein.

Example 1 may include a locker configured to store a package, the locker comprising a plurality of adjustable storage compartments, and a door coupled to the locker and configured to actuate between an open position and a closed position to provide access to at least one of the plurality of adjustable storage compartments.

Example 2 may comprise the locker of example 1 and/or some example herein, further comprising one or more adjustable shelves configured to adjust the size of the plurality of adjustable storage compartments.

Example 3 may comprise the locker of example 2 and/or some example herein, further comprising a series of panels comprising a plurality of tracks.

Example 4 may comprise the locker of example 3 and/or some example herein, wherein the series of panels comprises a top panel, a plurality of side panels, and a bottom panel.

Example 5 may comprise the locker of example 4 and/or some example herein, wherein at least one of the plurality of side panels comprises a track extending at least partially from the bottom panel to the top panel.

Example 6 may comprise the locker of example 4 and/or some example herein, wherein the at least one of the plurality of side panels comprises a track extending perpendicular to the bottom panel.

Example 7 may comprise the locker of example 2 and/or some example herein, wherein the door comprises a first portion and a second portion, wherein the first portion is configured to actuate towards and away from the second portion, and wherein the second portion is configured to actuate towards and away from the first portion.

Example 8 may comprise the locker of example 7 and/or some example herein, wherein the door comprises a third portion and a fourth portion, wherein the third portion is configured to actuate towards and away from the fourth portion, and wherein the fourth portion is configured to actuate towards and away from the third portion.

Example 9 may comprise the locker of example 7 and/or some example herein, wherein the first portion and second portion are configured to actuate to a shelf of the one or more adjustable shelves, and wherein the second portion remains at the shelf as the first portion actuates away from the second portion to the open position.

Example 10 may comprise the locker of example 4 and/or some example herein, wherein a shelf of one or more adjustable shelves comprises a planar surface to the top panel and the bottom panel.

Example 11 may comprise the locker of example 4 and/or some example herein, wherein the one or more adjustable shelves comprise a partition, and wherein the partition comprises a planar surface to the plurality of side panels.

Example 12 may comprise the locker of example 3 and/or some example herein, wherein the one or more adjustable shelves, the door, and the series of panels form the plurality of adjustable storage compartments.

Example 13 may comprise the locker of example 12 and/or some example herein, further comprising at least one actuator coupled to the one or more adjustable shelves, wherein the at least one actuator is configured to move the one or more adjustable shelves to resize the plurality of adjustable storage compartments.

Example 14 may comprise the locker of example 3 and/or some example herein, wherein the adjustable storage compartment comprises a secured position for securing the package within the adjustable storage compartment and an unsecured position for removing the package from the storage compartment.

Example 15 may comprise the locker of example 3 and/or some example herein, wherein the one or more adjustable shelves actuate towards and away from the bottom panel.

Example 16 may comprise the locker of example 3 and/or some example herein, wherein a partition of the one or more adjustable shelves actuates toward the plurality of side panels.

Example 17 may comprise the locker of example 3 and/or some example herein, wherein the one or more adjustable shelves are configured to actuate between a rolled position and an unrolled position.

Example 18 may comprise the locker of example 2 and/or some example herein, further comprising at least one belt configured to actuate the door between the open position and the closed position.

Example 19 may comprise a locker configured to store a package, the locker comprising a frame; a series of panels coupled to the frame, wherein a plurality of tracks extend along the series of panels; one or more adjustable shelves disposed within the series of panels along the plurality of tracks; and a door configured to actuate between an open position and a closed position, wherein the door comprises a first portion and a second portion, wherein the first portion is configured to actuate towards and away from the second portion, and wherein the second portion is configured to actuate towards and away from the first portion.

Example 20 may include a method for storing a package within a locker, the method comprising selecting a package size via a user interface; actuating a plurality of adjustable storage compartments to the package size; actuating a door configured to reveal one of the adjustable storage compartments complementing the package size; placing the package within one of the adjustable storage compartments of the locker; and closing the door.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although the embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A locker configured to store a package, the locker comprising:
   a plurality of adjustable storage compartments;
   a door coupled to the locker and configured to actuate between an open position and a closed position to provide access to at least one of the plurality of adjustable storage compartments; and
   one or more adjustable shelves configured to adjust a size of the plurality of adjustable storage compartments;
   wherein the one or more adjustable shelves comprise a partition, and the partition actuates via a motor at a secured position for securing the package while the door is at the closed position and the partition actuates via the motor at an unsecured position for removing the package while the door is at the open position.

2. The locker of claim 1, further comprising a series of panels comprising a plurality of tracks.

3. The locker of claim 2, wherein the series of panels comprises a top panel, a plurality of side panels, and a bottom panel.

4. The locker of claim 3, wherein at least one of the plurality of side panels comprises a track extending at least partially from the bottom panel to the top panel.

5. The locker of claim 3, wherein at least one of the plurality of side panels comprises a track extending perpendicular to the bottom panel.

6. The locker of claim 3, wherein a shelf of one or more adjustable shelves comprises a planar surface to the top panel and the bottom panel.

7. The locker of claim 3, wherein the one or more adjustable shelves comprise a partition, and wherein the partition comprises a planar surface to the plurality of side panels, and the partition actuates via a belt.

8. The locker of claim 2, wherein the one or more adjustable shelves, the door, and the series of panels form the plurality of adjustable storage compartments.

9. The locker of claim 2, wherein the one or more adjustable shelves actuate towards and away from a bottom panel.

10. The locker of claim 2, wherein the partition of the one or more adjustable shelves actuates toward a plurality of side panels, and the partition actuates a belt.

11. The locker of claim 1, wherein the door comprises:
    a first portion; and
    a second portion, wherein the first portion is configured to actuate towards and away from the second portion, and wherein the second portion is configured to actuate towards and away from the first portion.

12. The locker of claim 11, wherein the door comprises:
    a third portion; and
    a fourth portion, wherein the third portion is configured to actuate towards and away from the fourth portion, and wherein the fourth portion is configured to actuate towards and away from the third portion, wherein the first portion, the second portion, the third portion and the fourth portion are configured to move simultaneously.

13. The locker of claim 11, wherein the first portion and the second portion are configured to actuate to a shelf of the one or more adjustable shelves, and wherein the second portion remains at the shelf as the first portion actuates away from the second portion to the open position.

14. The locker of claim 1, further comprising a second belt configured to actuate the door between the open position and the closed position.

15. A locker configured to store a package, the locker comprising:
    a frame;
    a series of panels coupled to the frame, wherein a plurality of tracks extend along the series of panels;
    one or more adjustable shelves disposed within the series of panels along the plurality of tracks; and
    a door configured to actuate between an open position and a closed position, wherein the door comprises a first portion and a second portion, wherein the first portion is configured to actuate towards and away from the second portion, and wherein the second portion is configured to actuate towards and away from the first portion;
    wherein the one or more adjustable shelves comprise a partition, and the partition actuates via a motor at a secured position for securing the package while the door is at the closed position and the partition actuates via the motor at an unsecured position for removing the package while the door is at the open position.

* * * * *